(12) United States Patent
Smith et al.

(10) Patent No.: US 7,065,195 B1
(45) Date of Patent: Jun. 20, 2006

(54) SYSTEMS AND METHODS RELATING TO MULTIPURPOSE CARDS

(75) Inventors: Denise E. Smith, Duluth, GA (US); Christopher A. Gutierrez, Marietta, GA (US)

(73) Assignee: MCI, Inc., Ashburn, VA (US)

( * ) Notice: Subject to any disclaimer, the term of this patent is extended or adjusted under 35 U.S.C. 154(b) by 1023 days.

(21) Appl. No.: 09/611,196

(22) Filed: Jul. 6, 2000

Related U.S. Application Data

(60) Provisional application No. 60/175,451, filed on Jan. 8, 2000.

(51) Int. Cl.
*H04M 17/00* (2006.01)
*H04M 15/00* (2006.01)

(52) U.S. Cl. ............... 379/144.01; 379/114.19; 379/114.2; 379/114.01

(58) Field of Classification Search ........... 379/114.19, 379/114.2, 114.01; 235/380, 381; 455/40; 283/72, 81, 98, 101, 103, 105
See application file for complete search history.

(56) References Cited

U.S. PATENT DOCUMENTS

| | | |
|---|---|---|
| D280,214 S | 8/1985 | Opel |
| D290,136 S | 6/1987 | Ball et al. |
| 4,718,697 A | 1/1988 | Bearadus van Amelsfort |
| 4,815,768 A | 3/1989 | Applebaum et al. |
| 4,829,168 A | 5/1989 | Nakahara |
| D310,386 S | 9/1990 | Michels et al. |
| D310,849 S | 9/1990 | Davis |
| 4,978,146 A | 12/1990 | Warther et al. |
| 5,060,794 A | 10/1991 | Linn et al. |
| 5,343,647 A | 9/1994 | Bulka |
| 5,513,117 A * | 4/1996 | Small ................. 235/381 |
| 5,538,291 A * | 7/1996 | Gustafson ............ 235/487 |
| 5,570,081 A | 10/1996 | Holstrom |
| 5,607,738 A * | 3/1997 | Bishop ................. 428/43 |
| 5,629,977 A * | 5/1997 | Fonseca ............... 379/144 |
| 5,640,447 A * | 6/1997 | Fonseca ............... 379/144 |
| 5,684,291 A * | 11/1997 | Taskett ................ 235/487 |
| 5,720,500 A | 2/1998 | Okazaki et al. |
| 5,760,381 A * | 6/1998 | Stich et al. ........... 379/144 |
| D396,882 S | 8/1998 | Neal, Jr. |
| 6,186,554 B1* | 2/2001 | Raming ................ 283/81 |
| D439,037 S | 3/2001 | Kebarian |
| D443,621 S | 6/2001 | Seaton |
| 6,250,556 B1* | 6/2001 | Schneider ............. 235/487 |
| 6,269,158 B1* | 7/2001 | Kim .................. 379/144.01 |
| 6,328,341 B1* | 12/2001 | Klure ................. 235/380 |
| 6,385,860 B1* | 5/2002 | MacWilliams et al. ... 33/613 |

OTHER PUBLICATIONS

Giant Introduces Frequent Shopper Program; 'A Simple Way to Save. A Simple Way to Win. A Simple Way to Give.' PR NEWSWIRE, Aug. 31, 2000.

(Continued)

*Primary Examiner*—Barry W Taylor

(57) ABSTRACT

A multipurpose card serves as an effective marketing tool in today's competitive marketplace. The multipurpose card includes a main portion and a key ring portion. The key ring portion may be separated from the main portion.

2 Claims, 15 Drawing Sheets

OTHER PUBLICATIONS

Linda Purpura. Bi-Lo Launches New Bonus Card Program, Supermarket News, vol. 47, No. 12, p. 19, Mar. 24, 1997.
Bi-Lo Customers Have 'Key' Advantage, PR Newswire, Jan. 6, 1997.
Change In Your Pocket At All Times Kids Connect In Style With New MCI Prepaid Shout! Calling Cards Exclusive Speed Dial Express Offers Convenience to Kids; Peace of Minds to Parents, PR NEWSWIRE, Jul. 29, 1998.

* cited by examiner

SYSTEMS AND METHODS RELATING TO MULTIPURPOSE CARDS

RELATED APPLICATIONS

This application claims priority under 35 U.S.C. § 119 based on U.S. Provisional Application Ser. No. 60/175,451, filed Jan. 8, 2000, the disclosure of which is incorporated herein by reference.

BACKGROUND OF THE INVENTION

A. Field of the Invention

The present invention relates generally to calling, credit, and gift cards and, more particularly, to systems and methods relating to multipurpose cards.

B. Description of Related Art

In today's ever-changing economy, forward-looking businesses need new ways to compete. One area that has and continues to play an important role in competition is advertising. Consumers typically rely on advertising when determining which products and services to buy. As such, the quantity and quality of a business's advertising often determines how well the business performs.

Today, it is quite common for businesses to advertise their products and services on television, radio, in newspapers, on billboards, buses, and even on the Internet. Such advertising is not only expensive, but is typically only heard or seen by consumers for very short periods of time. For example, a typical television commercial lasts between 15 and 30 seconds. Therefore, businesses are faced with the difficult task of making an immediate and lasting impression on consumers in a very short amount of time. As a result, businesses are constantly looking for new ways to promote their products, services, etc. that are both cost-effective and provide a long lasting impression on the consumer.

There exists a need for systems and methods by which businesses may market their products and services in a cost-effective manner.

SUMMARY OF THE INVENTION

Systems and methods consistent with the present invention address this need through the use of a multipurpose card that acts as both a conventional calling, credit, or gift card and a keytag card for a key ring.

In accordance with the purpose of the invention as embodied and broadly described herein, a multipurpose calling card, in one implementation consistent with the present invention, includes a calling card portion and a key ring portion. The key ring portion may be separated from the calling card portion of the multipurpose calling card.

In another implementation consistent with the present invention, a method for manufacturing customized cards is provided. The method includes receiving personal information and generating multipurpose cards. Each of the multipurpose cards includes a main portion and a keytag portion. The keytag portion may be separated from the main portion. The method also includes customizing at least one of the main portion and the keytag portion of each multipurpose card to include the personal information.

In yet another implementation consistent with the present invention, a method for providing customized cards is provided. The method includes receiving a request for one or more multipurpose cards having a main portion and a keytag portion. The request includes personalized information to be added to the multipurpose cards. The method also includes modifying the main portion and the keytag portion of each multipurpose card to include the personalized information and providing the modified cards.

In a further implementation consistent with the present invention, a method for manufacturing a calling card is provided. The method includes generating a card that is substantially the size of a conventional calling card, adding a perforation to create a first calling card portion and a second portion, and forming a hole in the second portion.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a multipurpose card. It will be appreciated that the systems and methods described herein are applicable to many types of cards, such as calling cards, gift cards (i.e., cards having a predetermined amount of money stored thereon), credit cards, and the like.

Exemplary Card Configurations

Figure 1A:
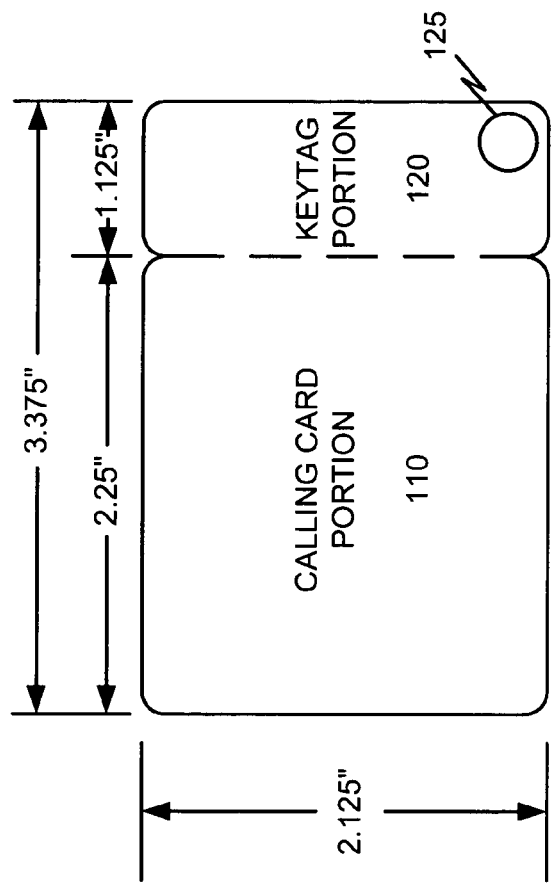
FIGS. 1A and 1B illustrate exemplary front and back configurations of a multipurpose prepaid calling card consistent with the present invention.

FIG. 1A illustrates an exemplary front configuration of a multipurpose prepaid calling card 100 consistent with the present invention. As illustrated, the multipurpose prepaid calling card 100 includes a calling card portion 110 and a keytag portion 120. The multipurpose prepaid calling card 100 is approximately the same size as a conventional prepaid telephone calling card (i.e., approximately 3.375 inches wide and 2.125 inches high) and is perforated such that the keytag portion 120 may be separated from the calling card portion 110. According to an exemplary implementation, a perforation configuration is chosen to not only allow for easy separation of the calling card and keytag portions 110 and 120, respectively, by a consumer, but to also hold the portions 110 and 120 together during shipping. For example, an exemplary multipurpose prepaid calling card 100 may include five or six perforations.

The calling card portion 110 of the multipurpose card 100 acts as a conventional prepaid phone card. The calling card portion 110 may be approximately 2.25 inches wide and 2.125 inches high so as to be easily inserted into a wallet. It will be appreciated that other dimensions may be used. According to an exemplary implementation, the calling card portion 110 may contain an identification number and/or a magnetic stripe that may be used, for example, to identify the particular card. This identification information allows the amount of time remaining on the multipurpose card 100 to be monitored.

Figure 1B:
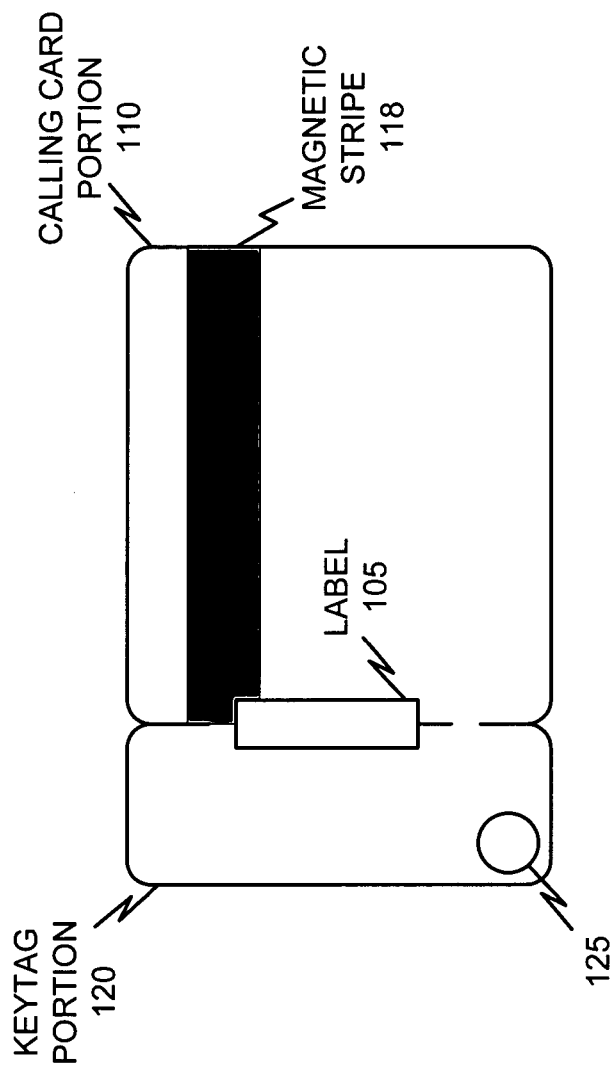

FIG. 1B illustrates an exemplary back configuration of a multipurpose prepaid calling card 100 consistent with the present invention. As illustrated, the multipurpose prepaid calling card 100 may include a magnetic stripe 118 that contains, for example, identification information. The magnetic stripe 118 may store the identification number associated with the particular multipurpose card 100. The identification number may be read from the magnetic stripe 118 by swiping the calling card portion 110 through a magnetic card reader.

In order to assure that the calling card portion 110 and keytag portion 120 are not separated during shipping, the multipurpose card 100 may include an adhesive label 105. The adhesive label 105 may be any type of conventional label that would prevent unintentional separation of the two portions 110 and 120 of the multipurpose card 100.

Figure 1C:
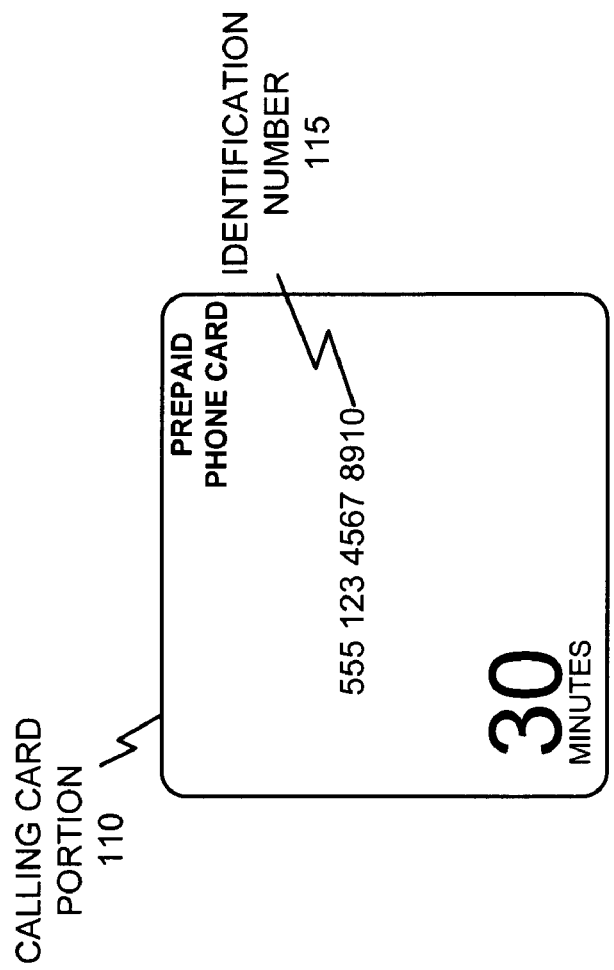
FIG. 1C illustrates an exemplary configuration of the calling card portion of FIG. 1A.

FIG. 1C illustrates exemplary configuration of the calling card portion 110 of FIG. 1A. As illustrated in FIG. 1C, the front face of the calling card portion 110 may contain an identification number 115. It will be appreciated that the identification number 115 may, in the alternative, be displayed on the back of the card.

When making a telephone call, the identification number 115 may be entered, for example, via a telephone keypad. Alternatively, this identification number 115 may be given orally to an operator in order to activate the prepaid minutes associated with the multipurpose card 100. The calling card portion 110 may also contain an expiration date (not shown) that provides the user with a date by which the prepaid minutes of the card 100 must be used.

As will be described in more detail below, the front of the calling card portion 110 may also display one or more company logos, personal expressions, such as "Congratulations," "Thank You," "Good Job," and the like. As such, a multipurpose card 100, consistent with the present invention, may be used as gifts.

Figure 1D:
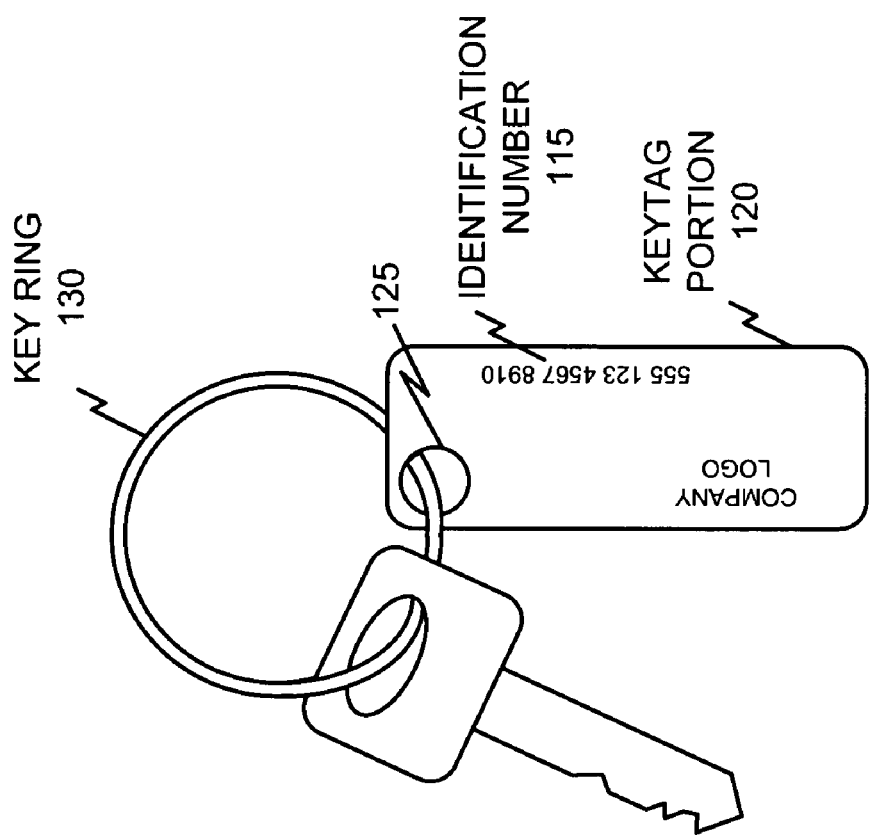
FIG. 1D illustrates a connection of an exemplary keytag portion of a multipurpose card, consistent with the present invention, to a conventional key ring.

Returning to FIG. 1A, the keytag portion 120 of the multipurpose card 100 may be used for marketing or promotional purposes. The keytag portion 120 may be approximately 1.125 inches wide and 2.125 inches high. The keytag portion 120 may be of other dimensions or shapes than those illustrated in FIG. 1A. For example, the keytag portion 120 may alternatively be of a circular shape. The keytag portion contains a hole 125 that allows for the entire multipurpose card 100 or only the keytag portion 120 to be attached to a conventional key ring. FIG. 1D illustrates an exemplary keytag portion 120 of a multipurpose card 100 connected to a conventional key ring 130. As will be described in more detail below, the keytag portion 120 may also display information similar to that placed on the calling card portion 110. For example, the keytag portion 120 may include one or more company logos, personal expressions, photographs, an identification number, etc. This information may be placed on the front and/or back of the keytag portion 120.

Figure 2A:
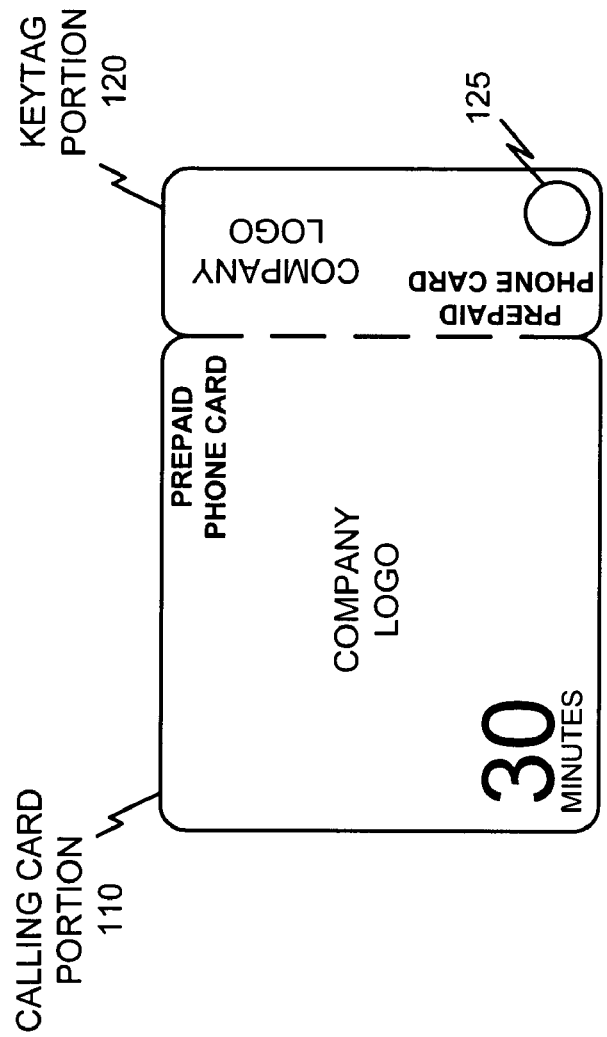
FIGS. 2A–2C illustrate exemplary configurations of the multipurpose prepaid calling card consistent with the present invention.
Figure 2B:
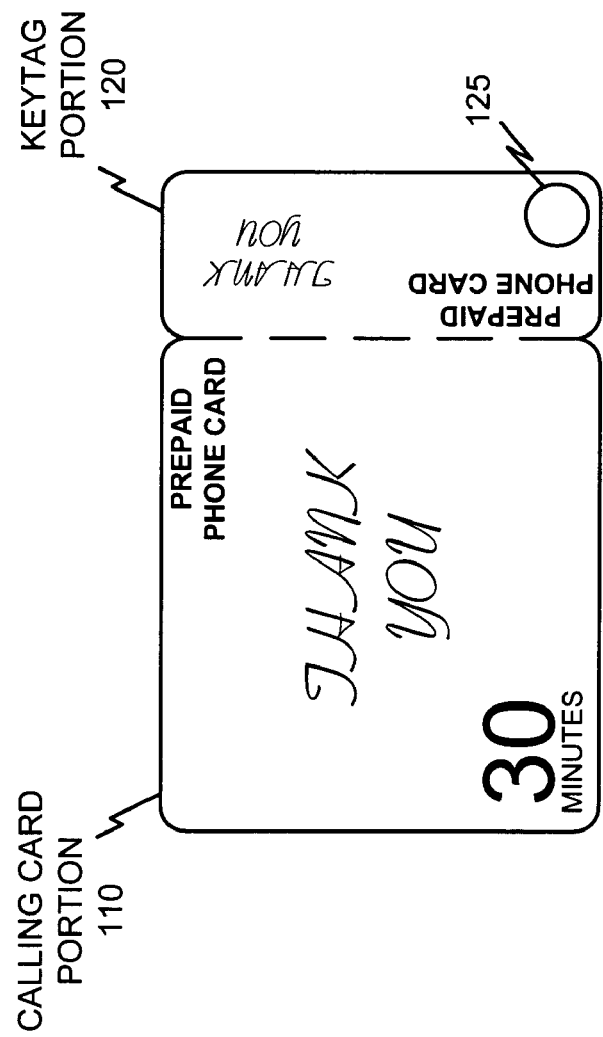
Figure 2C:
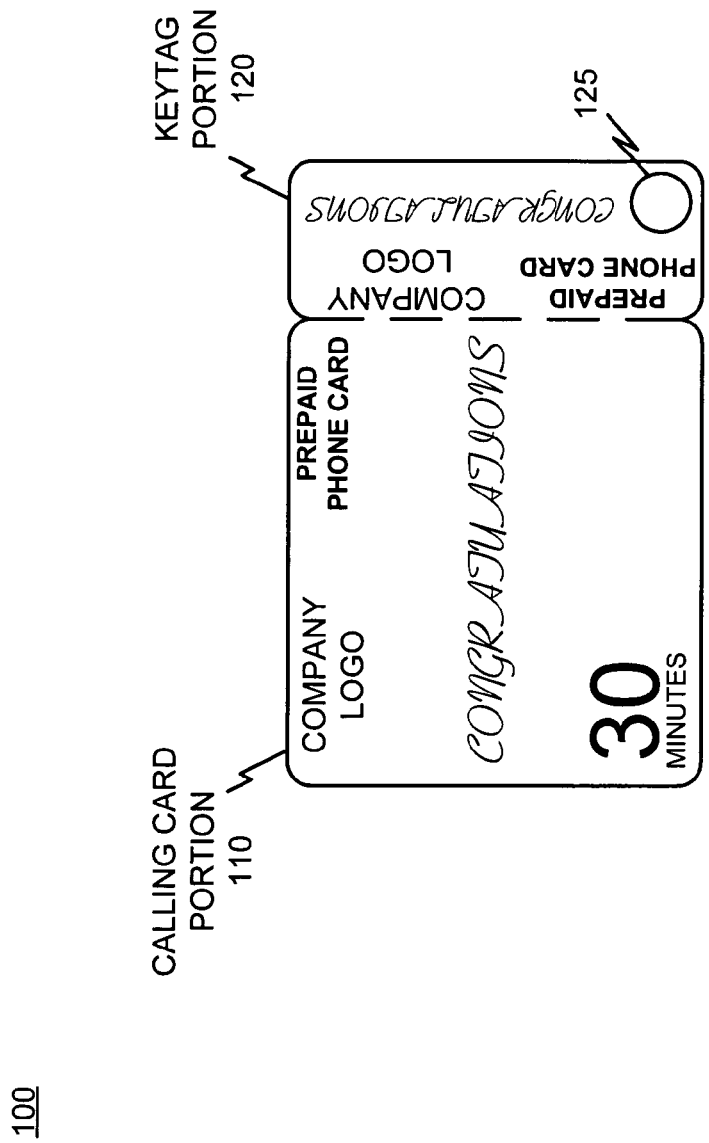

FIGS. 2A–2C illustrate exemplary configurations of the multipurpose prepaid calling card 100 consistent with the present invention. In FIG. 2A, the multipurpose card 100 includes a company logo. As illustrated, the company logo may be placed on both the calling card portion 110 and the keytag portion 120 of the multipurpose card 100. In FIG. 2B, the multipurpose card 100 includes a personal expression (i.e., "Thank You"). It will be appreciated that any type of personal expression may be used. Similar to the card illustrated in FIG. 2A, the personal expression can be placed on both the calling card portion 110 and the keytag portion 120 of the multipurpose card 100. In FIG. 2C, the multipurpose card 100 includes both a company logo and a personal expression. It will be appreciated that the cards illustrated in FIGS. 2A–2C may include any number of company logos or other information, such as personal expressions, photographs of family members, and the like.

Figure 3:
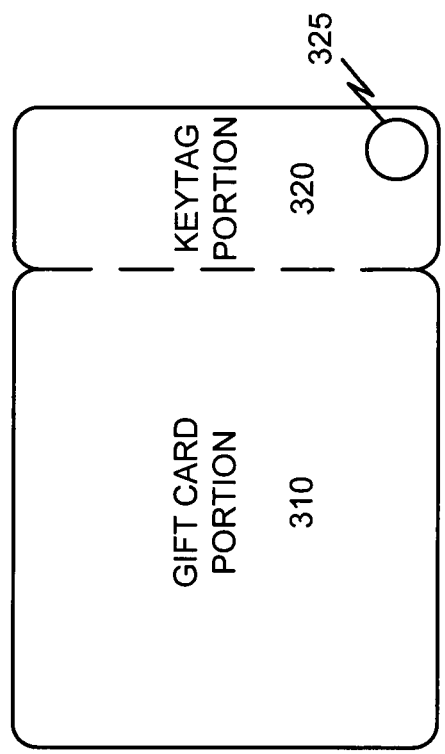
FIG. 3 illustrates an exemplary configuration of a multipurpose gift card consistent with the present invention.

FIG. 3 illustrates an exemplary configuration of a multipurpose gift card 300 consistent with the present invention. As illustrated, the multipurpose gift card 300 includes a gift card portion 310 and a keytag portion 320 that may be separated from the gift card portion 310. According to an exemplary implementation, a multipurpose gift card 300, consistent with the present invention, may be approximately the same size as a conventional gift card (i.e., approximately 3.375 inches wide and 2.125 inches high).

The gift card portion 310 of the multipurpose gift card 300 acts as a conventional gift card. According to an exemplary implementation, the gift card portion 310 may contain an identification number and/or a magnetic stripe that may be used, for example, to identify the particular card. This identification may be used to access a user's account information. Similar to the multipurpose prepaid calling card 100 described above with regard to FIGS. 2A–2C, the gift card portion 310 may display one or more company logos and/or other information (e.g., personal expressions, family photographs, etc.).

The keytag portion 320 of the multipurpose gift card 300 may be used for marketing or promotional purposes. While the keytag portion 320 is illustrated as being of a rectangular shape, other shapes may alternatively be used. The keytag portion may contain a hole 325 that allows for either the entire multipurpose gift card 300 or only the keytag portion 320 to be attached to a conventional key ring. The keytag portion 320 may display one or more company logos and/or other information similar to that placed on the gift card portion 310.

It will be appreciated from FIGS. 1–3 above that a multipurpose card, consistent with the present invention, may be used in connection with a number of marketing or promotional programs. For example, the multipurpose card may be used to promote the launching of a new product or service by offering the card as a buying incentive. The card may be used to increase revenue. For example, the card may be offered as an incentive to purchase more of a particular product or service. The card may be used to promote a particular business. For example, the card may be used at a store's grand opening, milestone or special event to promote awareness of the store or business.

The card may be used to promote customer loyalty. For example, the card may be given as a reward to customers as an encouragement for repeat business. The card may be used to add value to a product. For example, the card may be given to frequent customers as part of a membership program. The card may be used to reward employees. For example, the card may be given to an employee as a reward for outstanding performance or goal attainment. The cards may be used to promote responsible participation. For example, the cards may be given away at special events or occasions that include alcohol with enough minutes to call a cab or ride. The card may also be used for sharing information, such as engagements, weddings, new home purchases, birth announcements, etc.

Exemplary Card Issuing System

Figure 4:
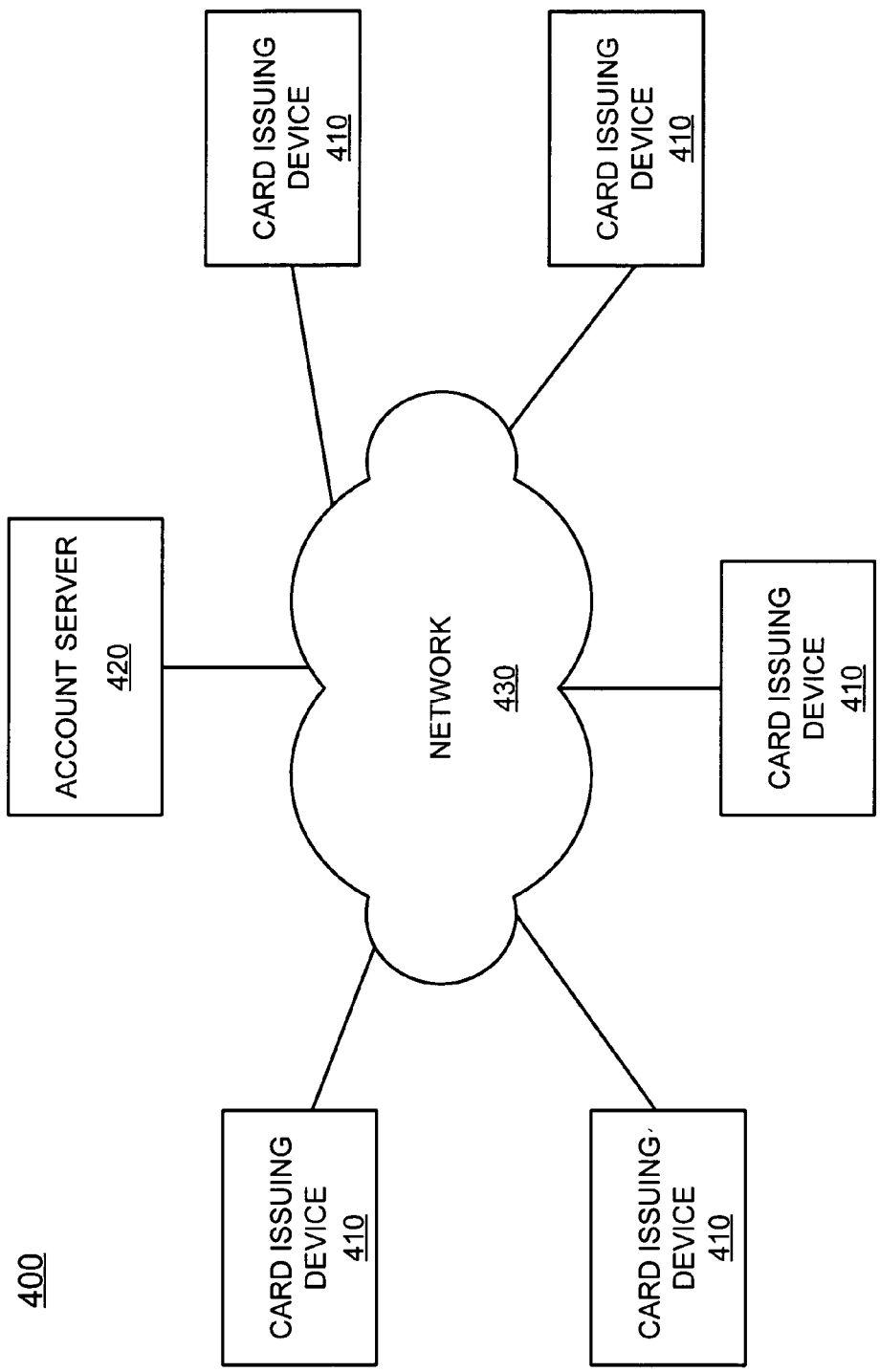
FIG. 4 illustrates an exemplary card issuing system consistent with the present invention.

FIG. 4 illustrates an exemplary card issuing system 400 consistent with the present invention. The system 400 includes multiple card issuing devices 410 connected to an account server 420 via a network 430. The network 430 may include the Internet, an intranet, a local area network (LAN), a wide area network (WAN), a public telephone network, such as the Public Switched Telephone Network (PSTN), or a similar network.

Figure 5:
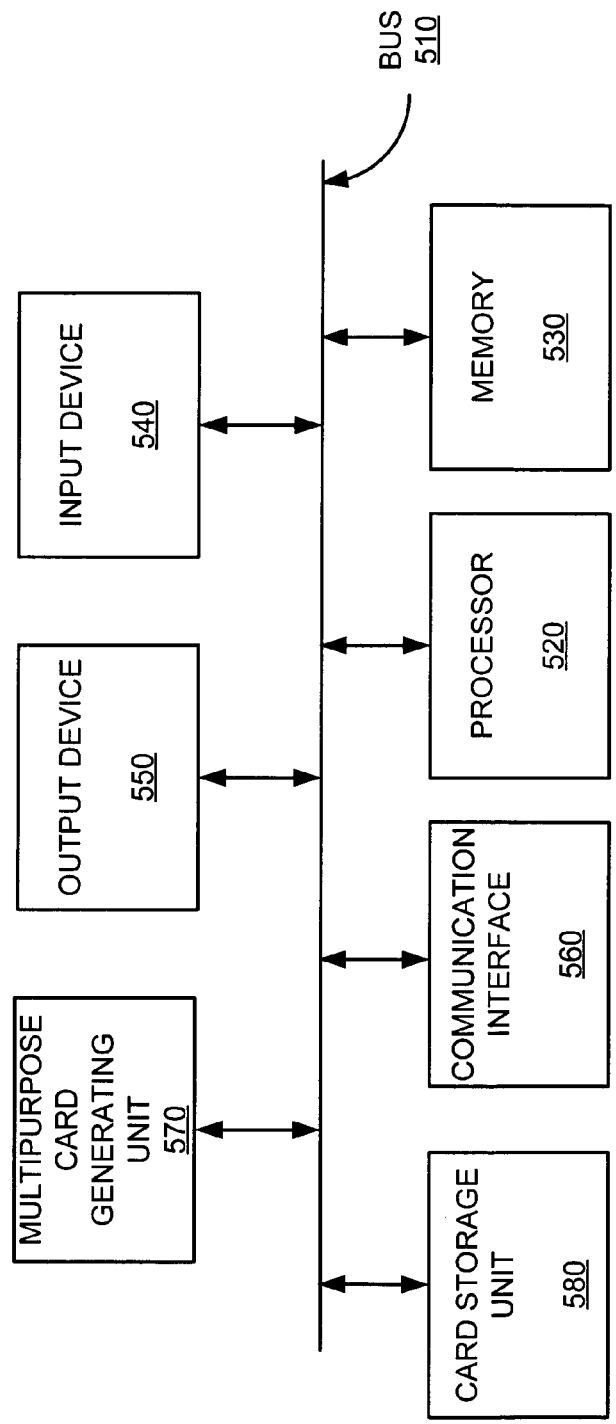
FIG. 5 illustrates an exemplary card issuing device in an implementation consistent with the present invention.

The card issuing device 410 includes any type of device capable of issuing multipurpose cards 100 to users. Five card issuing devices 410 have been shown in FIG. 4 for simplicity. FIG. 5 illustrates an exemplary card issuing device 410 in an implementation consistent with the present invention. The card issuing device 410 includes a bus 510, a processor 520, a memory 530, an input device 540, an output device 550, a communication interface 560, a multipurpose card generating unit 570, and a card storage unit 580. The bus 510 permits communication among the components of the card issuing device 410.

The processor 520 may be any type of conventional processor or microprocessor that interprets and executes instructions. The memory 530 may be a random access memory (RAM) or another type of dynamic storage device that stores information and instructions to be executed by the processor 520; a read only memory (ROM) or another type of static storage device that stores static information and instructions for use by the processor 520; and/or a type of magnetic or optical recording medium and its corresponding drive.

The input device 540 may include any conventional mechanism that permits an operator to input information into the card issuing device 410, such as a keyboard, a mouse, a pen, biometric or voice recognition mechanisms, etc. The output device 550 may include any conventional mechanism that outputs information to the operator, including a display, a printer, a pair of speakers, a mechanism for customizing and outputting a card 100 from the card storage unit 580, etc. The communication interface 560 may include any transceiver-like mechanism that enables the card issuing device 410 to communicate with the account server 420. For example, the communication interface 560 may include mechanisms for communicating via a network, such as the network 430.

The multipurpose card generating unit 570 includes one or more devices capable of generating multipurpose cards 100. In an implementation consistent with the present invention, the multipurpose card generating unit 570 may be separate from the card issuing device 410. The multipurpose cards 100 created by the multipurpose card generating device 570 are essentially blank (i.e., they have not yet been customized). Once the multipurpose cards 100 have been generated, they are transferred to the card storage unit 580.

The card storage unit 580 stores multipurpose cards 100 to which company logos, personal expressions, photographs, etc. may be added. The card storage unit 580 transfers multipurpose cards 100 to the output device 550 where the cards 100 may be tailored to the specific needs of a particular user. For example, a particular user may want to add a picture of a newborn to a group of multipurpose cards 100 in order to announce the birth to friends and family members.

Returning to FIG. 4, the account server 420 stores and monitors account information associated with the multipurpose prepaid calling card 100. The account server 420 may include one or more centrally located or distributed computer systems, laptops, personal digital assistants (PDAs), or other similar types of devices. The account server 420 receives information from the card issuing devices 410 and the multipurpose cards 100 and tracks and stores the number of minutes used by each card 100. The account server 420 may also, in response to a request by a multipurpose card 100 holder, recharge the multipurpose card 100 by increasing the number of minutes associated with the card 100. Additionally, the account server 420 may track any expiration date that may be associated with a particular card 100 to determine whether use of the card 100 should be granted. It will be appreciated that the account server 420 and the card issuing device 410 may be included in the same device.

Figure 6:
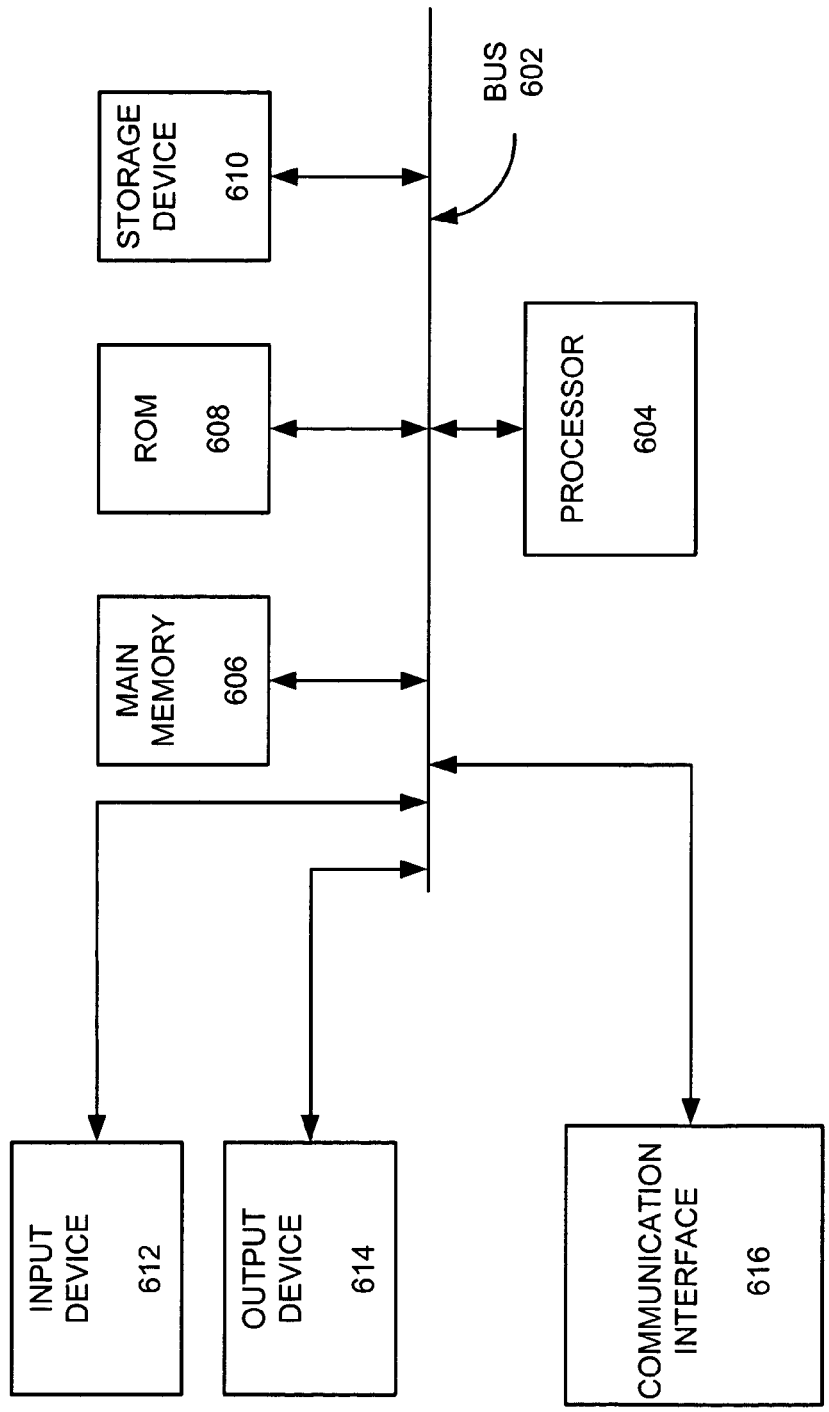
FIG. 6 illustrates an exemplary account server consistent with the present invention.

FIG. 6 illustrates an exemplary account server 420 consistent with the present invention. In FIG. 6, the account server 420 includes a bus 602, a processor 604, a main memory 606, a ROM 608, a storage device 610, an input device 612, an output device 614, and a communication interface 616. The bus 602 permits communication among the components of the account server 420.

The processor 604 may include any type of conventional processor or microprocessor that interprets and executes instructions. The main memory 606 may include a RAM or another type of dynamic storage device that stores information and instructions for execution by the processor 604. Main memory 606 may also be used to store temporary variables or other intermediate information used during execution of instructions by processor 604.

ROM 608 may include a conventional ROM device and/or another type of static storage device that stores static information and instructions for processor 604. The storage device 610 may include a magnetic disk or optical disk and its corresponding drive and/or some other type of magnetic or optical recording medium and its corresponding drive for storing information and/or instructions.

The input device 612 may include any conventional mechanism that permits an operator to input information to the account server 420, such as a keyboard, a mouse, a pen, voice recognition and/or biometric mechanisms, etc. The output device 614 may include any conventional mechanism that outputs information to the operator, including a display, a printer, a pair of speakers, etc.

The communication interface 616 may include any transceiver-like mechanism that enables the account server 420 to communicate with other devices and/or systems, such as card issuing devices 410. For example, the communication interface 616 may include a modem or an Ethernet interface to a network. Alternatively, communication interface 616 may include other mechanisms for communicating via a network, such as network 430.

The account server 420 manages account information for the multipurpose cards 100 in response to processor 604 executing sequences of instructions contained in a computer-readable medium. A computer-readable medium may include one or more memory devices, such as memory 606 or storage device 610, and/or carrier waves. Execution of the sequences of instructions causes processor 604 to perform process steps that will be described hereafter. In alternative embodiments, hard-wired circuitry may be used in place of or in combination with software instructions to implement the present invention. Thus, the present invention is not limited to any specific combination of hardware circuitry and software.

Exemplary Processing for Obtaining a Multipurpose Card

Figure 7:
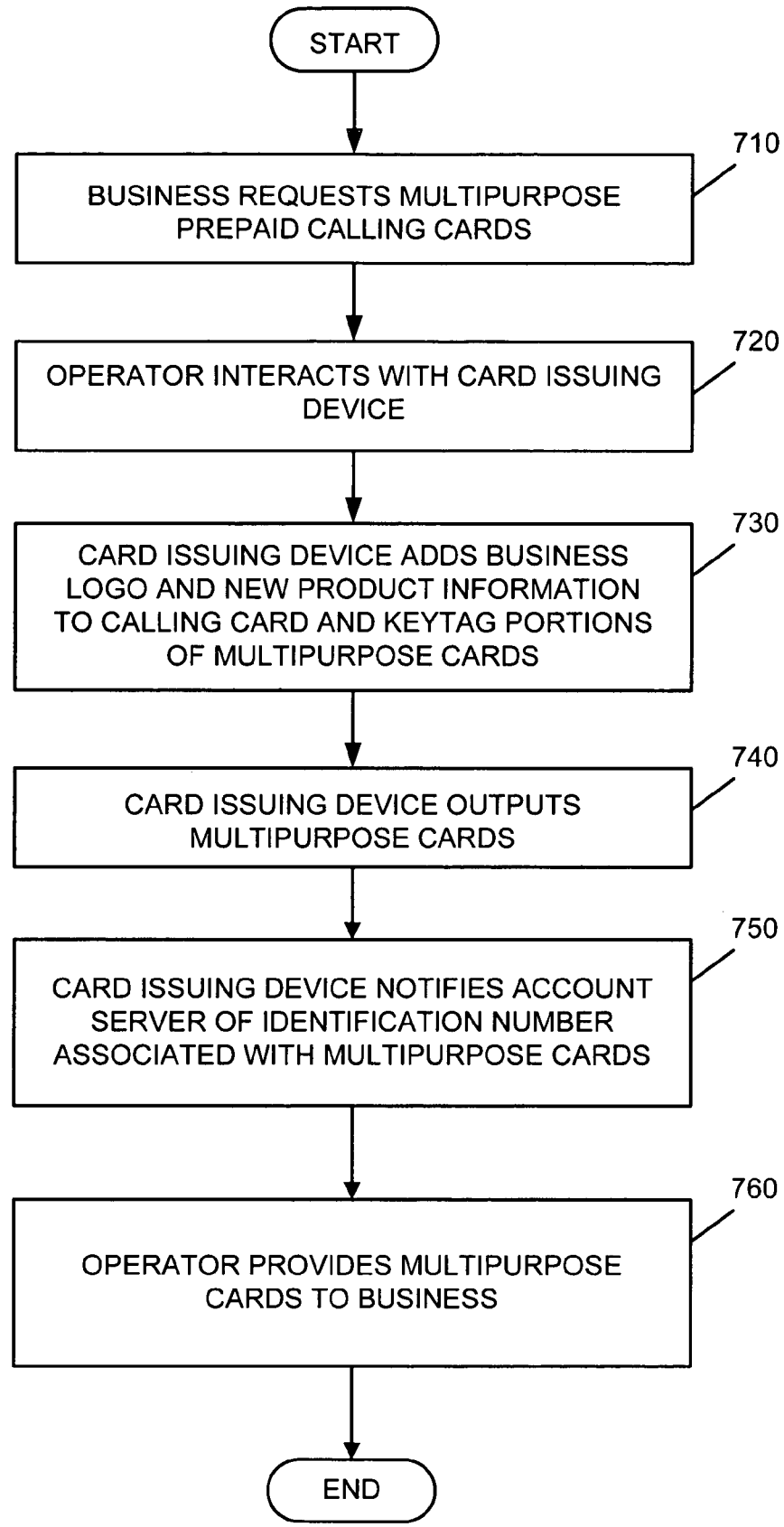
FIG. 7 illustrates an exemplary process for issuing a multipurpose card in a manner consistent with the present invention.

FIG. 7 illustrates an exemplary process for issuing a multipurpose card 100 in a manner consistent with the present invention. It will be assumed for explanatory purposes that a business wishes to purchase a group of multipurpose prepaid calling cards 100 in order to promote a new product that the business is selling. Processing begins when the business requests the purchase of the multipurpose prepaid calling cards [step 710]. The request may be made using any conventional technique, such as via a telephone call, e-mail, etc. In the request, the business may specify the quantity to be purchased, the number of minutes to be allocated to each of the multipurpose cards 100, an expiration date (if any), and the type of information that should be displayed on the cards 100, such as a business logo, information related to the new product, etc.

Upon receiving the request, an operator interacts with a card issuing device 410 through the use of input device 540 [step 720]. The operator inputs the quantity and type of cards to be issued (e.g., the number of free minutes to be associated with each card 100) and the personal information to be displayed on each card 100. At this time, the operator may associate each multipurpose card 100 with an identification number. Alternatively, the card issuing device 410 may automatically associate each card 100 with an identification number. As described above, the identification number may be displayed on the card 100 and/or stored on an associated magnetic stripe 118.

The card issuing device 410 retrieves the quantity and type of cards 100 desired and adds the business logo and new product information to the multipurpose cards 100 as desired [step 730]. The card issuing device 410 may add this information to both the calling card portion 110 and keytag portion 120 of the multipurpose cards 100. The card issuing device 410 outputs the multipurpose prepaid calling cards 100 [step 740].

The card issuing device 410 notifies the account server 420 of the identification numbers associated with the multipurpose cards 100 [step 750]. This allows the account server 420 to set up an account for each card 100 and to track the time remaining on each card 100. The operator may then provide the multipurpose prepaid calling cards 100, having the business logo and new product information displayed thereon, to the business [step 760]. The business may then distribute the multipurpose prepaid calling cards 100 in order to promote the business's new product.

In an alternative implementation consistent with the present invention, the business may interact directly with the card issuing device 410 in order to obtain the customized multipurpose cards 100.

Exemplary System for Using a Multipurpose Card

Figure 8:
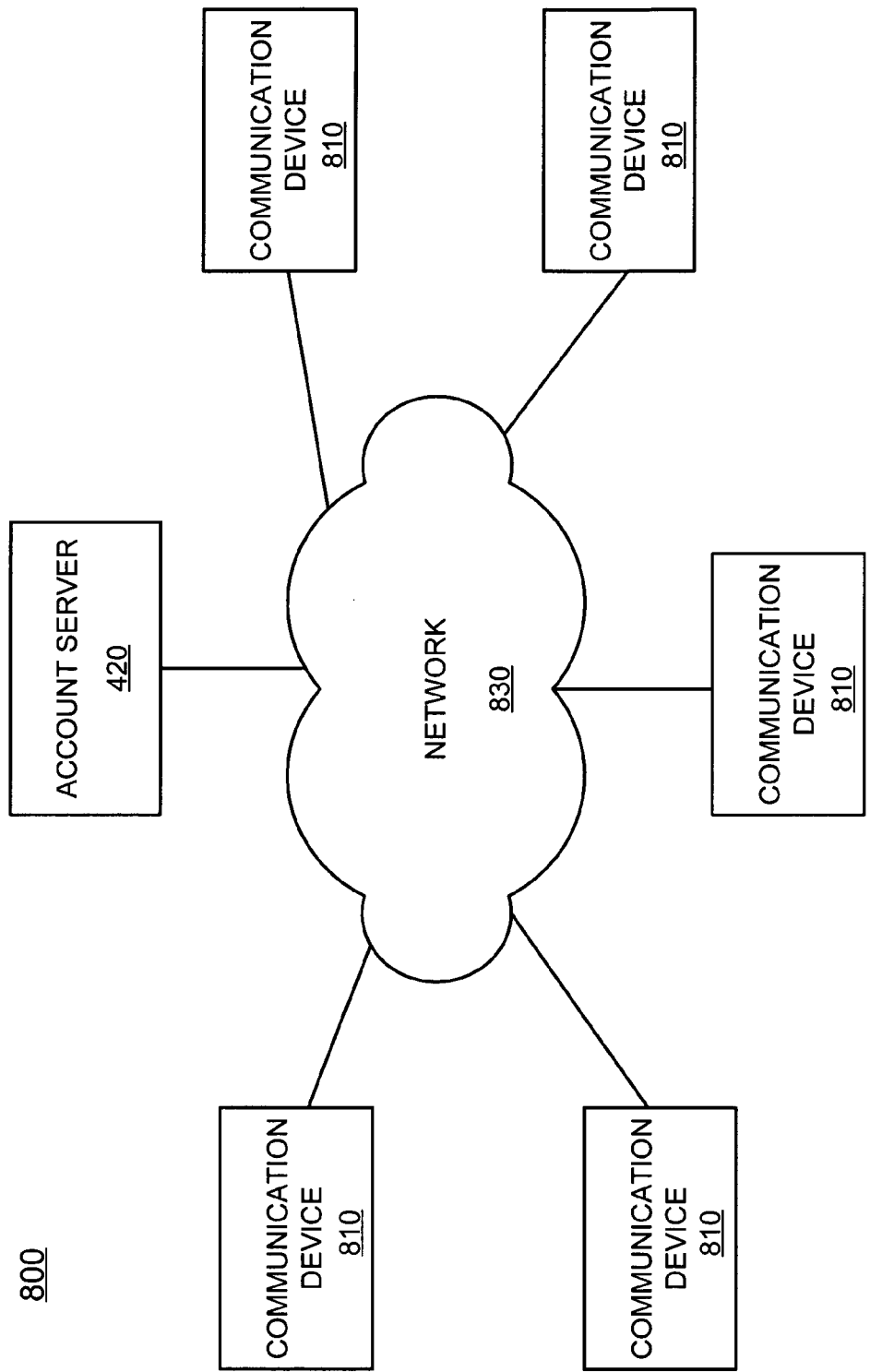
FIG. 8 illustrates an exemplary system in which a multipurpose card, consistent with the present invention, may be used.

FIG. 8 illustrates an exemplary system 800 in which a multipurpose card, consistent with the present invention, may be used. It will be assumed for explanatory purposes that the multipurpose card is a multipurpose prepaid calling card 100, such as the one described above with respect to FIG. 1A. One skilled in the art will appreciate, however, that the following description is equally applicable to the use of other types of cards. The system 800 includes multiple communication devices 810 connected to an account server 420 via a network 830. The network 830 may include the Internet, a public telephone network, such as the PSTN, or another similar network capable of transmitting voice communications. The account server 420 may be configured as illustrated in FIG. 4.

The communication devices 810 may include any type of device capable of transmitting and receiving voice communications over the network 830, including, for example, a personal computer, a laptop, a PDA, a telephone or video conferencing device, or the like. The communication devices 810 may connect to network 830 in any conventional manner, such as via a wired, wireless, or optical connection. According to exemplary implementations of the present invention, a user makes telephone calls via a communication device 810 using a multipurpose prepaid calling card 100. The communication devices 810 receive information from the multipurpose prepaid calling card 100 by, for example, swiping the card or entering an identification number.

Figure 9:
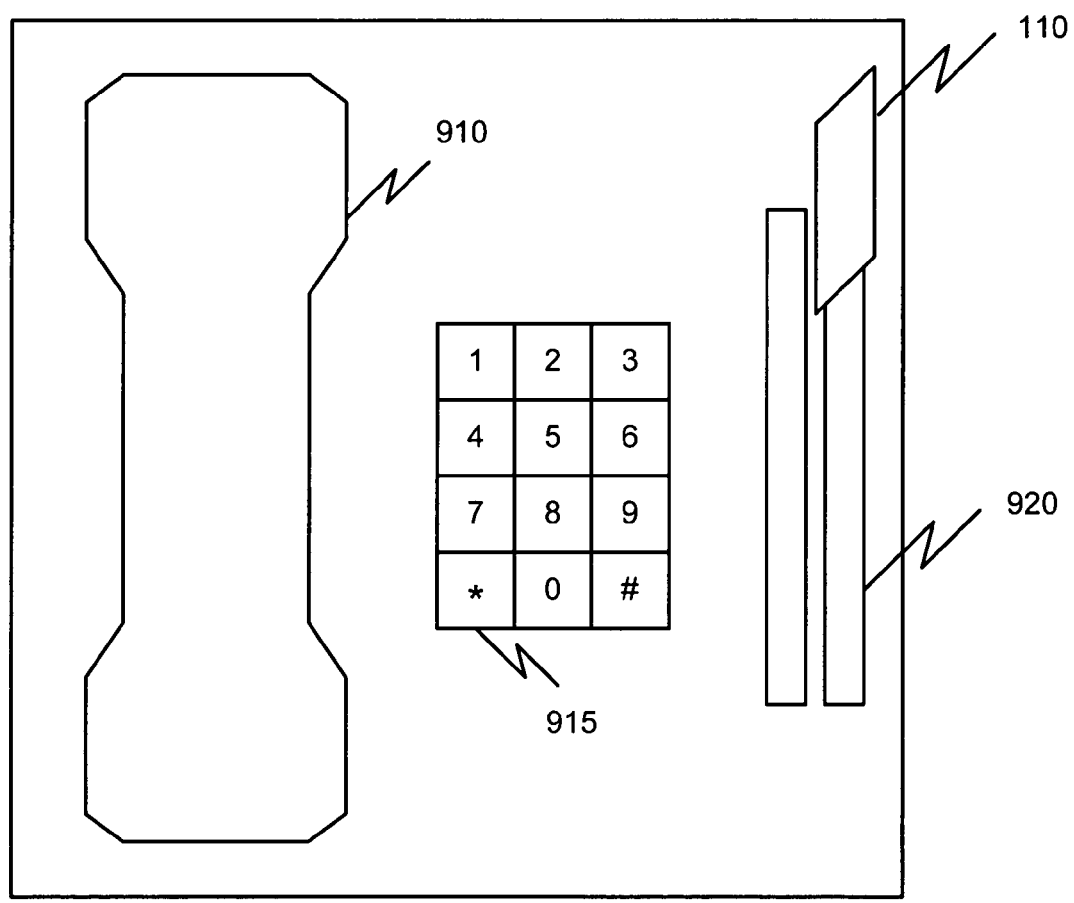
FIG. 9 illustrates an exemplary communication device consistent with the present invention.

FIG. 9 illustrates an exemplary communication device 810 consistent with the present invention. As illustrated, the communication device 810 includes a conventional telephone system having a telephone receiver 910, a numeric keypad 915, and a magnetic card reader 920.

The telephone receiver 910 allows a user of the communication device 810 to receive and transmit voice communications. The numeric keypad 915 allows the user to enter a telephone number and/or other types of information. The keypad 915 may also allow for the entry of alphanumeric information.

The magnetic card reader 920 allows for the swiping of the calling card portion 110 of the multipurpose prepaid calling card 100. Upon swiping, the magnetic card reader 920 reads the information contained in the card's magnetic stripe 118 and transmits this information to the account server 420. It will be appreciated that the entire multipurpose prepaid calling card 100 may alternatively be swiped through the magnetic card reader 920. It will be further appreciated that the user may, in order to activate the prepaid minutes associated with the card 100, enter an identification number associated with the calling card portion 110 via the keypad 915 instead of swiping the calling card portion 110 through the magnetic card reader 920.

Exemplary Processing for Using a Multipurpose Card

Figure 10:
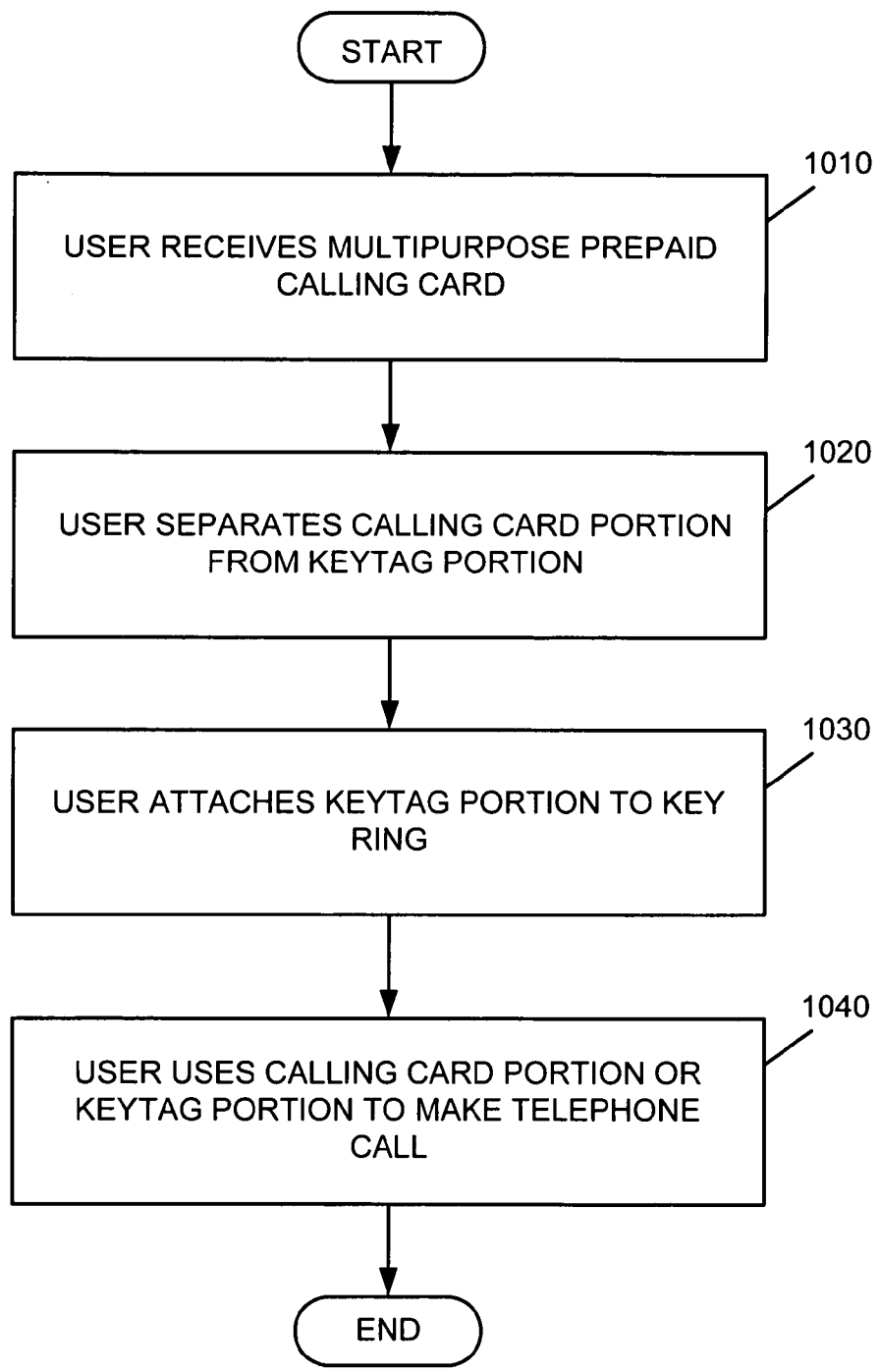
FIG. 10 illustrates an exemplary process for using a multipurpose card consistent with the present invention.

FIG. 10 illustrates an exemplary process for using a multipurpose card consistent with the present invention. For simplicity, the process will be described with reference to a multipurpose prepaid calling card. It will be appreciated, however, that the process is equally applicable to other types of cards, such as gift cards, credit cards, and the like. The process beings with a user receiving a multipurpose prepaid calling card 100 [step 1010]. As described above, the user may receive the card 100, for example, during a business's promotion of a new product. In such an event, the multipurpose card 100 may contain, on both the calling card portion 110 and keytag portion 120, a logo for the business or other information of interest to the business (e.g., an announcement of the new product).

Upon receiving the multipurpose prepaid calling card 100, the user may separate the calling card portion 110 from the keytag portion 120 [step 1020]. This separation process may be performed, for example, by simply bending the multipurpose card 100 at a line that separates the two portions 110 and 120. Alternatively, the user may, for example, use a pair of scissors to separate the calling card portion 110 from the keytag portion 120.

The user may then attach the keytag portion 120 of the multipurpose card 100 to a key ring 130 [step 1030]. Since the keytag portion 120 may contain such information as a company logo, the keytag portion 120 may effectively serve as a marketing tool. It will be appreciated that, prior to separating the two portions 110 and 120 of the card 100, the entire multipurpose card 100 may be attached to the key ring 130.

The user may use the calling card portion 110 or keytag portion 120, as described above, in a manner similar to a conventional prepaid phone card [step 1040]. In order to place a telephone call using the multipurpose card 100, the user may, for example, either swipe the magnetic stripe 118 of the card portion 110 through a magnetic reader 920 of a communication device 810 or simply enter an identification number 115, displayed on the calling card portion 110 or keytag portion 120, through the use of a keypad 915.

CONCLUSION

Systems and methods consistent with the present invention provide multipurpose cards that serve effectively as low cost promotional or marketing tools. The multipurpose cards have a main portion that may, for example, act as a conventional calling card, and a separable keytag portion that may be attached to a key ring. The main and keytag portions of the multipurpose cards may be customized to include such information as a company logo, information regarding a particular product or service, personal expressions (e.g., "Congratulations"), photographs, etc. Each individual part of the multipurpose cards may be used, for example, to place a telephone call, charge a particular item during a purchase, etc.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 7 and 10, the order of the steps may be modified in other implementations.

The scope of the invention is defined by the claims and their equivalents.

What is claimed is:

1. A method for manufacturing a calling card, comprising:
   generating a card, the card being substantially a size of a conventional calling card;
   creating a perforation to create a first calling card portion and a second portion;
   placing a label on the perforation; and
   forming a hole in the second portion.

2. The method of claim 1 wherein the creating includes:
   creating 5 or 6 perforations between the first calling card portion and the second portion.

* * * * *